(12) United States Patent
Kendall (10) Patent No.: US 6,974,491 B1
(45) Date of Patent: Dec. 13, 2005

(54) CARTRIDGE LOCKING DEVICE AND METHOD

(76) Inventor: Stephen P. Kendall, 2570 Turnage Valley Dr., Memphis, TN (US) 38133-8127

( * ) Notice: Subject to any disclaimer, the term of this patent is extended or adjusted under 35 U.S.C. 154(b) by 16 days.

(21) Appl. No.: 10/633,217

(22) Filed: Aug. 1, 2003

(51) Int. Cl.[7] .............................................. B01D 46/04

(52) U.S. Cl. ............................ 55/493; 55/378; 55/478; 55/481; 55/508; 55/490; 55/302

(58) Field of Search .......................... 55/378, 478, 481, 55/508, 490, 493, 302

(56) References Cited

U.S. PATENT DOCUMENTS

| | | | |
|---|---|---|---|
| 4,217,122 A * | 8/1980 | Shuler .......................... | 55/480 |
| 4,334,896 A | 6/1982 | Muller | |
| 4,395,269 A | 7/1983 | Schuler | |
| 5,062,872 A * | 11/1991 | Williams ...................... | 55/302 |
| 5,131,931 A | 7/1992 | Miley | |
| 5,599,364 A * | 2/1997 | Hawkins ...................... | 55/378 |
| 5,746,796 A | 5/1998 | Ambs | |
| 5,776,211 A * | 7/1998 | Jacob .......................... | 55/356 |
| 5,837,040 A | 11/1998 | Caughron | |
| 6,087,548 A | 7/2000 | Levy | |
| 6,149,699 A | 11/2000 | Grantham | |
| 6,214,077 B1 * | 4/2001 | Bitner et al. .................. | 55/490 |
| 6,364,923 B1 | 4/2002 | Wiedmeyer | |
| 6,444,005 B1 * | 9/2002 | Bitner .......................... | 55/480 |

FOREIGN PATENT DOCUMENTS

| | | |
|---|---|---|
| CA | 1254155 | 5/1989 |

OTHER PUBLICATIONS

Advertising Circular for Model J Filtrex Pulse-Jet Fabric Dust Collector by Steelcraft Corp. in the U.S. (2003), 2pgs.
Advertising Circular for Model S/SP Filtrex Reverse/Pulse-Jet Fabric and Scrap Collectors by Steelcraft Corp. in the U.S. (2003), 2 pgs.
Advertising Circular for Model C Filtrex Pulse-Jet Cartridge Dust Collector by Steelcraft Corp. in the U.S. (2003), 2pgs.
Advertising Circular for Model MT/MTI Filtrex Pulse-Jet Fabric Dust Collectors by Steelcraft Corp. in the U.S. (2003), 2pgs.
Advertising Circular for Model MR Filtrex Pulse-Jet Fabric Dust Collector Pnuematic Receiver by Steelcraft Corp. in the U.S. (2003), 2pgs.
Advertising Circular for Model MP/MPT Pulse-Jet Fabric Dust Collector by Steelcraft Corp. in the U.S. (2003), 2pgs.
Advertising Circular for Model CH Pulse-Jet Cartridge Dust Collector by Steelcraft Corp. in the U.S. (2003), 2pgs.
Advertising Circular for Model MS/MST Pulse-Jet Fabric Dust Collector by Steelcraft Corp. in the U.S. (2003), 2pgs.

* cited by examiner

*Primary Examiner*—Duane Smith
*Assistant Examiner*—Minh-Chau T. Pham
(74) *Attorney, Agent, or Firm*—Baker, Donelson, Bearman, Caldwell & Berkowitz, P.C.

(57) ABSTRACT

A cartridge locking device (10) for holding a filter media (14) in a plenum (12) in which an actuator (112) movable between a first position and a second position connects to a lever member (122) inwardly of the plenum (12) that moves between a position bearing on the filter media (14) to a spaced-apart position for replacing the filter media (14), the locking device (10) operable from the holding position to the spaced-apart position without opening the plenum (12), thereby reducing the time for the plenum (12) to be open during replacement operations. A method of locking and releasing a filter (14) for filter (14) change out is disclosed.

40 Claims, 5 Drawing Sheets

CARTRIDGE LOCKING DEVICE AND METHOD

TECHNICAL FIELD

The present invention relates to locking devices for holding filter medium in plenums. More particularly the present invention relates to locking devices that secure filters yet are operable to an unsecured position while reducing the time the plenum must be open for filter replacement.

BACKGROUND OF THE PRESENT INVENTION

Gasses, such as air, or liquids may become contaminated or polluted by harmful or potentially harmful substances such as particles which are radioactive, toxic or biologically active. The contaminated or polluted fluids typically need to be decontaminated or cleaned before they are permitted to circulate through an air circulation system or are released into the atmosphere.

Removal of contaminants is of particular concern in air ventilation or circulation systems, biological laboratories, and industry. For instance, ventilation or air circulation systems circulate air within enclosed spaces such as buildings. Often, circulating air carries contaminants such as dust and other particulate matter. It is desirable to remove dust and particulate matter before recirculating the air to provide air that is clean for breathing.

Many biological laboratories include sealed processing rooms. During handling, testing, or observation of biological agents, harmful biological substances may become airborne. These airborne biological agents must be removed from the air inside the sealed room before the air can be released from the sealed room.

Factories and industrial plants generate wastes as a byproduct of the manufacturing or industrial processes. These wastes often take the form of particles which are impure, radioactive, toxic or biologically active in combination with liquids or gasses, including air. It is desirable to remove the particulate wastes from the gasses or liquids before discharging the gasses or liquids into the atmosphere.

Filters have become accepted devices to remove the particulate waste from gasses or liquids. Typically, the filter seats in a filter housing where the filter traps dust and other particulate matter in the fluid that passes through the housing while permitting the filtered fluids, whether gaseous or liquid, to flow through the filter and out of the housing. The filtered fluid is then released into the atmosphere or is recirculated through the system.

However, over time and through use, the filter becomes laden with the particulate waste and contaminants and must be replaced to maintain an acceptable level of filtration of the fluid. Typically, the change out of a contaminated filter involves opening the filter housing, disengaging a contaminated filter from registry with the housing, removing the contaminated filter into a change out bag, replacing the contaminated filter with an installed clean filter, securing the clean filter into the housing, and resealing the housing. These steps are labor intensive and require careful attention.

Of particular concern during replacement of the filter is that the interior of the housing remains contaminated with wastes. Attempts have been made to develop systems and mechanisms for protecting maintenance workers from contamination when replacing the contaminated filters. Notwithstanding these developments and concerns, the filter housings are open during filter change-outs. These systems and mechanisms continue to require the workers to perform numerous steps while exposed to the contaminated filter or the interior of the contaminated filter housing.

Accordingly, a need exists in the art for an apparatus and method that minimizes the number of steps required to be completed within the contaminated filter housing when replacing or changing out a filter by providing a locking device that secures filters yet is operable to an unsecured position from outside the housing and thereby reducing the time and steps necessary for the filter housing to be open during filter change out. It is to such that the present invention is directed.

BRIEF SUMMARY OF THE PRESENT INVENTION

The present invention meets the need in the art by providing a cartridge locking device for holding a filter media in a plenum yet being operable to release the filter for replacement to reduce the time needed for the plenum to be open for filter replacement. The locking device includes an actuator member extending through an opening defined by a wall of a plenum for a filter. The actuator moves between a first position for holding the filter and a second position for replacing the filter. A lever member connects to the actuator member inwardly of the plenum. The lever member is movable between a first position holding a filter in the plenum in response to the actuator being in the first position and a spaced-apart position for replacement of the filter.

In another aspect, the present invention provides a method of operating a cartridge locking device to hold a filter in a filter plenum and release the filter during replacement operations, comprising the steps of:

(a) moving an actuating member from a first position to a second position, said actuating member extending through an opening defined by a wall of a plenum for a filter and connecting therein to a lever member; and (b) moving the lever member between a first position holding the filter in the plenum responsive to the actuator being in the first position and a second position spaced apart from the filter for removing the filter from the plenum, whereby the actuating member moving between the first and second positions moves the lever member between the first and second positions relative to the filter.

Objects, advantages, and features of the invention will become apparent upon a reading of the following detailed description of the present invention in conjunction with the drawings and the appended claims.

DETAILED DESCRIPTION

Figure 1:
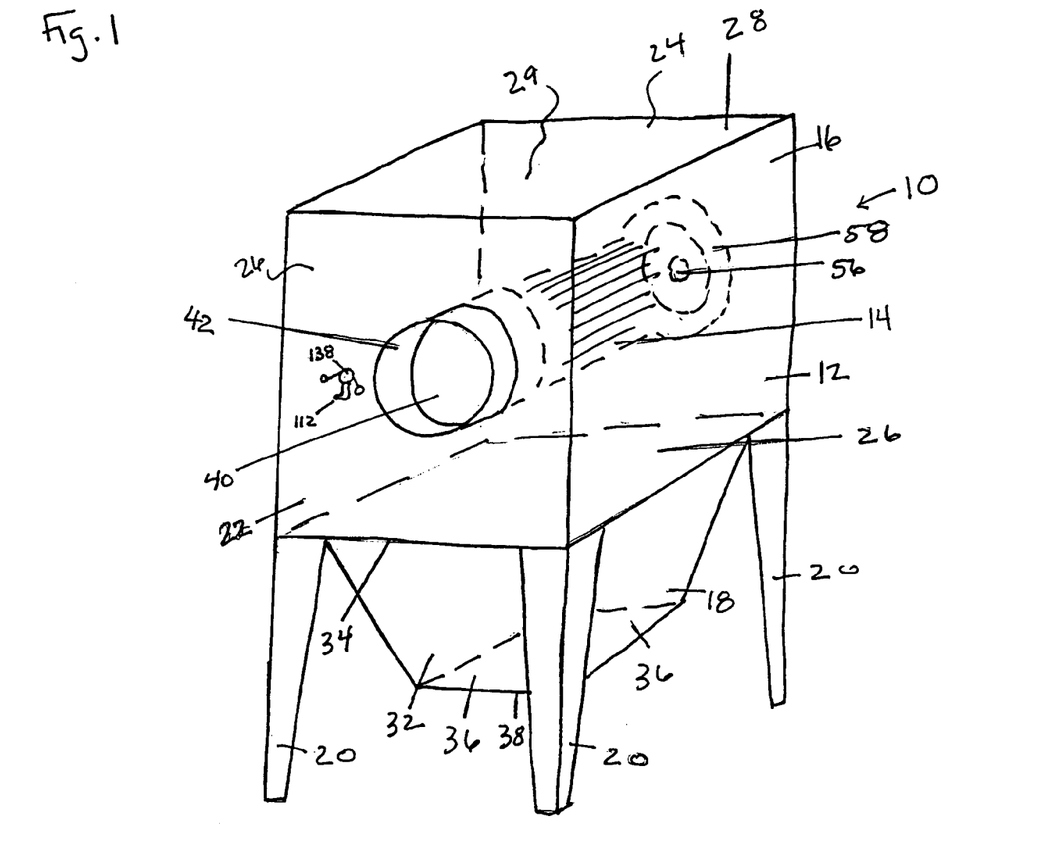
FIG. 1 is a right frontal perspective view of a locking device for a filter operable outwardly of a filter plenum according to the present invention.

Referring now in more detail to the drawings in which like parts have like identifiers, FIG. 1 illustrates in right frontal perspective view a locking device 10 according to the present invention to secure a cartridge-type filter 14 in a plenum 12. The plenum 12 in the illustrated embodiment includes an upper section 16 and a lower section 18. Legs 20 support the upper section 16. The upper section 16 includes a front wall 22, an opposing rear wall 24, a pair of opposing side walls 26, and an upper ceiling 28. The walls 22, 24, 26, 28 define an inner portion 29 of the plenum 12.

The lower section 18 includes a hopper 32. The hopper 32 is secured at an upper end 34 to the upper section 16. The hopper 32 has four walls 36. The four walls 36 converge to define a funnel that defines an opening 38 at a distal end of the hopper 32. The hopper 32 receives particulate material gravity-fed from the upper section 16 and funneled downwardly by the walls 36. The particulate material falls through the opening 38 and out of the hopper 32. In one application of the present invention, the hopper 32 connects to a pneumatic conveying system for conveying the particulate material that falls out of the hopper 32 to a remote location for further handling, processing or storage.

The front wall 22 of the upper section 16 of the plenum 12 defines a port 40 for entry access into the plenum 12 for replacement of the filter media 14. The rear wall 24 of the plenum 12 defines an outlet 56. A gasket 58 engages the outlet 56 for sealing engagement of the filter 14 with the outlet 56 from the plenum 12. An annular collar 42 extends from the front wall 22 inwardly and outwardly of the plenum 12. The filter 14 passes through the collar 42 when replacing the filter 14.

Figure 3:
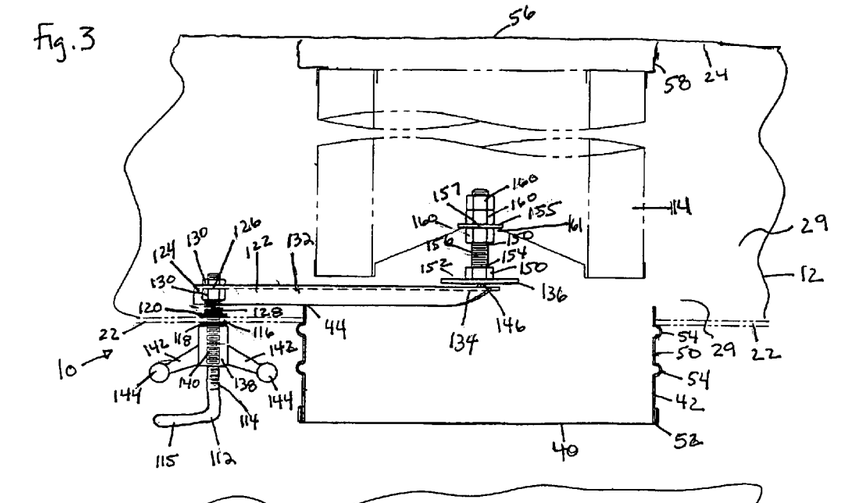
FIG. 3 is cross-sectional top view of the locking device shown in FIG. 1 in a locked position.

FIG. 3 illustrates in cross-sectional top view the locking device 10 in a locked position whereby the filter 14 is held in the plenum 12. An edge of the collar 42 defines a pivot 44 inwardly of the plenum 12, for a purpose discussed below. The collar 42 includes a valley 50 between a pair of ridges 54 extending around an exterior surface. The collar 42 conventionally receives a filter disposal bag having an open end held by the ridges 54 and a band received in the valley 50 during filter change operations.

Figure 2:
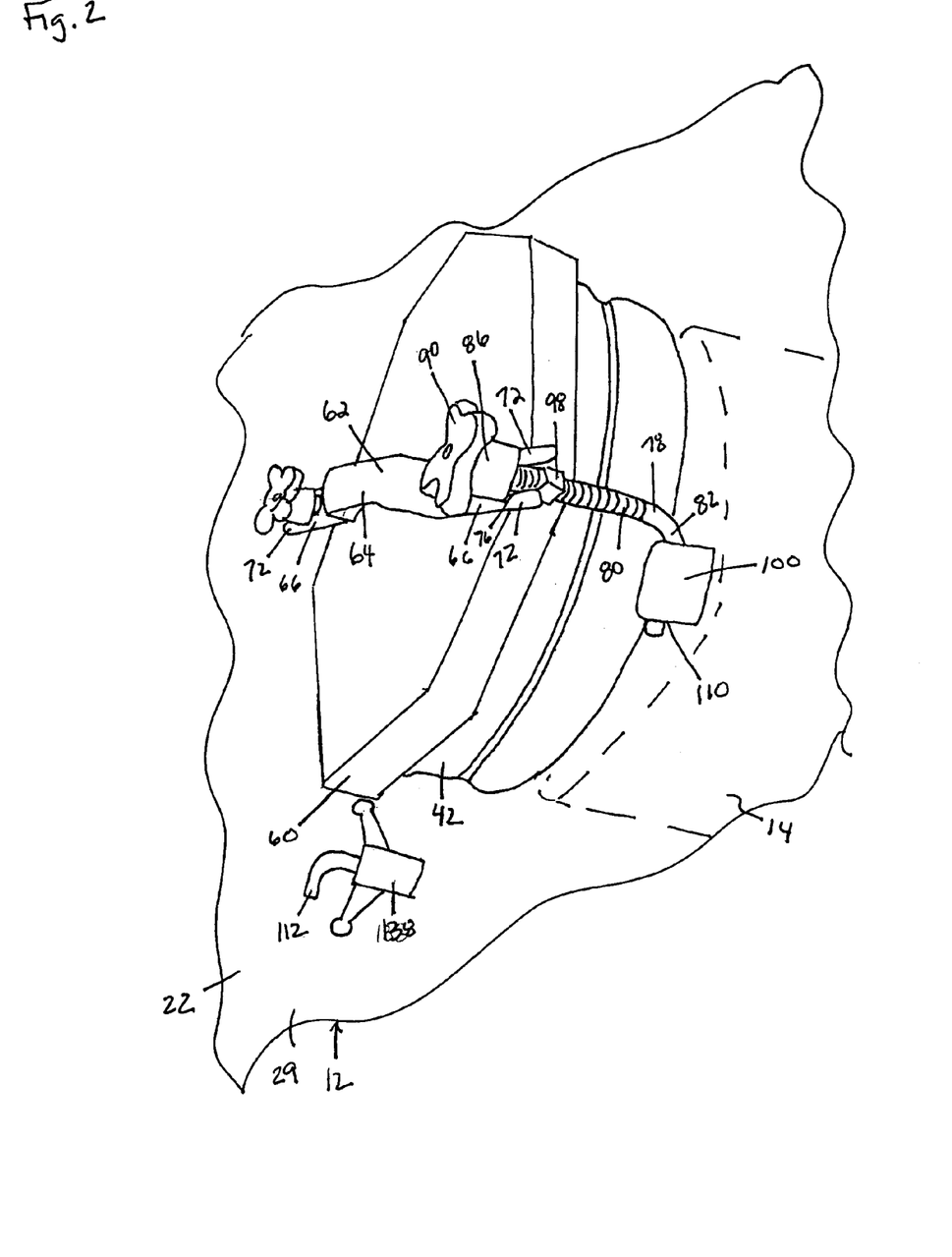
FIG. 2 is a right frontal perspective view of an access cover for the plenum shown in FIG. 1.

FIG. 2 illustrates in right frontal perspective view a door 60 providing access to the plenum 29 for removing and inserting filters 14. The door 60 is removable, and engages the collar 42 to selectively close the port 40 as discussed below. A bar 62 secures to the outer surface of the door 60. The bar 62 includes a U-shaped portion 64 and two opposing legs 66 that extend outwardly past opposing edges of the door 60. The U-shaped portion 64 allows for gripping engagement to assist removing and replacing the door. A pair of fingers 72 extend longitudinally from the legs 66. The fingers 72 define a recess or gap 76 therebetween.

The bar 62 secures the door 60 to the collar 42. This is accomplished in cooperation with a pair of L-shaped pins 78 that have a threaded portion 80 and an unthreaded portion 82. The threaded portion 80 is selectively received in the gap 76. A handle 86 threadably connects to the distal end of the threaded portion 80 in the gap 76 and bears against the fingers 72. To facilitate rotation of the handle 86, four arms 90 extend outwardly and are spaced equidistantly apart.

The pin 78 receives a nut 98 disposed between the front wall 22 outwardly the plenum 12 and the fingers 72. The nut 98 provides a bearing surface and cooperates with the handle 86 when tightened on the pin 78 to securely engage the bar 62 and the pin 78. A pair of loop members 100 on opposing sides of the collar 42 extend from the front wall 22. The loop member 100 defines an opening 110 adapted for receiving the unthreaded portion 82 of the pin 78. The pin 78 is adapted for hinging movement relative to the loop members 100. The pin 78 moves outwardly away from the collar 42 and inwardly towards the collar for inserting the threaded portion 80 in the gap 76.

Referring back to FIG. 3, the locking device 10 of the present invention comprises an L-shaped actuator 112. The actuator 112 includes a threaded portion 114 and an unthreaded portion 115. The threaded portion 114 extends through an opening 116 defined by the front wall 22 of the plenum 12. The threaded portion 114 receives a pair of washers 118, 120. The washers 118, 120 are disposed on opposite sides of the wall 22.

The locking device 10 further includes a lever member 122. A first end 124 of the lever member 122 defines an opening 126. The opening 126 receives the threaded portion 114 of the actuator 112 inwardly of the plenum 12. Nuts 130 received on the threaded portion 114 secure the actuator 112 to the lever member 122. A spring or resilient member 128 is received on the threaded end 114 of the actuator 112 between the washer 120 and the first end 124 of the lever 122. The spring 128 biases the first end 124 of the lever member 122 away from the wall 22 inwardly of the plenum 12. An intermediate portion generally 132 of the lever member 122 selectively contacts the pivot 44 on the collar 42. As discussed below, the pivot 44 causes a distal end 134 of the lever member 122 to bear against a palm button 136 on the filter 14.

A locking member 138 engages the actuator 112. The locking member 138 defines a threaded bore 140. The threaded portion 114 of the actuator 112 receives the locking member 138 adjacent to the washer 118 outwardly of the plenum 12. A pair of arms 142 in spaced relation extend from an outer surface of the locking member 138. In the illustrated embodiment, the arms 142 extend at oblique angles relative to a longitudinal axis of the bore 140. Each of the arms 142 includes a sphere 144 to facilitate gripping engagement during operation of the locking member 138.

The locking device 10 assembles by threadingly engaging the locking member 138 with the threaded portion 114 of the actuator 112. The threaded portion 114 then receives the washer 118, and the threaded portion 114 inserts through the opening 116 into the plenum 12. The interior portion of the actuator 112 receives the washer 120 and inserts longitudinally through the spring 128 and through the opening 126 in the first end 124 of the lever member 122. The nuts 130 received on the threaded end of the actuator connect the actuator 112 to the lever 122.

The locking device 10 of the present invention holds the filter 14 in place in the plenum 29. In the illustrated embodiment, the palm button 136 on the filter 14 includes a bearing face 146 on a first side of the palm button 136. An annular flange 150 extends from the opposite side 152 of the palm button 136. The flange 150 defines a threaded recess 154. A threaded shaft 156 threadably engages the recess 154. The filter 14 includes an annular plate 155. The plate 155 defines a central opening 157. Nuts 160 received on the opposite end 158 of the shaft 156 secure the bearing surface 146 to the filter 14. The opposite end 158 of the shaft 156 threads into a threaded channel 161 defined by a first side of the filter 14.

Figure 4:
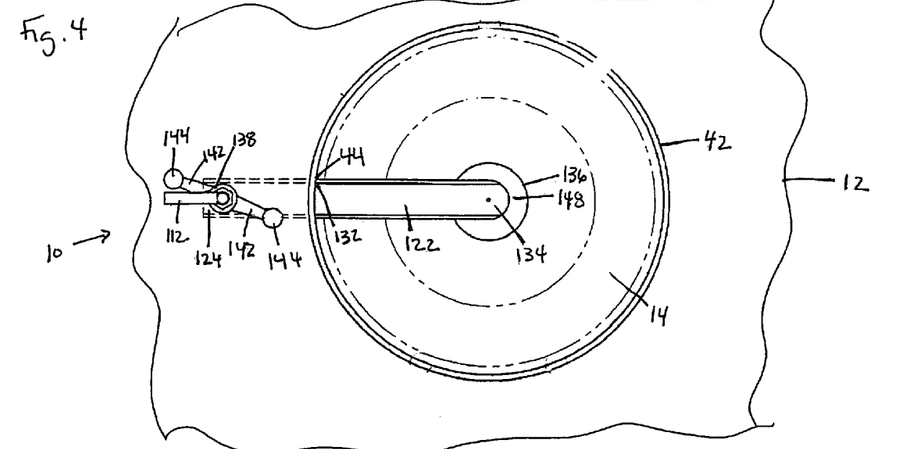
FIG. 4 is a plan view of the locking device shown in FIG. 1 in a locked position.
Figure 7:
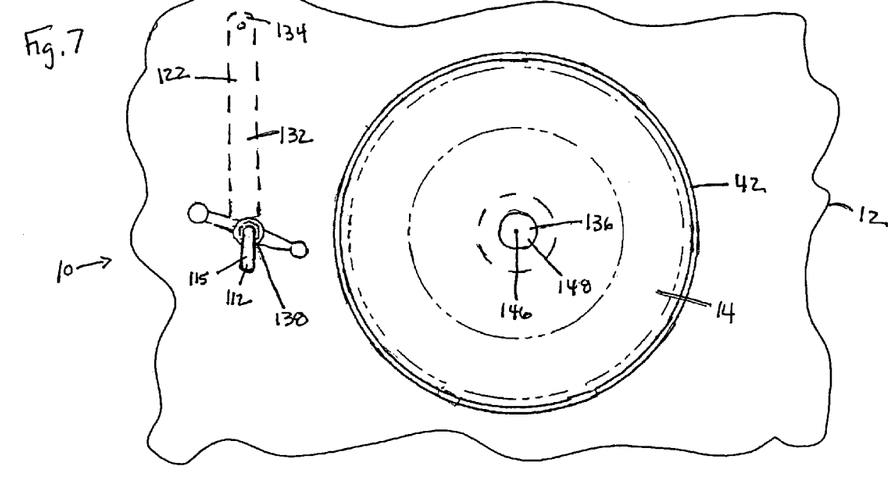
FIG. 7 is a plan view of the locking device shown in FIG. 1 in an un-locked position.

The filter plenum 12 receives contaminated air through an inlet to the plenum 12. The air discharges from the filter plenum 12 through the outlet 56 after passing through the filter 14. The filter 14 removes particulates and contaminates from the air. With reference to FIGS. 4 and 7, the locking device 10 holds the cartridge-type filter 14 in the plenum 12 yet also operates to release the filter 14 with the plenum 12 closed, during filter replacement operations as discussed below. FIGS. 3 and 4 illustrate the locking member 138 in the locked position and the actuator 112 in the first position. The lever member 122 contacts the pivot 44 so that the distal end 134 bears against the palm button 136 of the filter 14. The lever member 122 thereby holds the filter 14 in sealing relation to the outlet 56 in the plenum 12. The locking device 10 however is releasable with the door 60 closed in order to reduce the time for the door 60 to be open during replacement of a used filter 14 with a new filter 14. This is accomplished by rotating the locking member 138 relative to the actuator 112 as guided by the threaded portion 114. The arms 142 of the locking member 138 assist with rotating the locking member 138. As the locking member 138 rotates, the actuator 112 moves longitudinally into the plenum 12 guided by the threaded portion 114 of the actuator 112 and under the biasing force of the spring 128.

Figure 5:
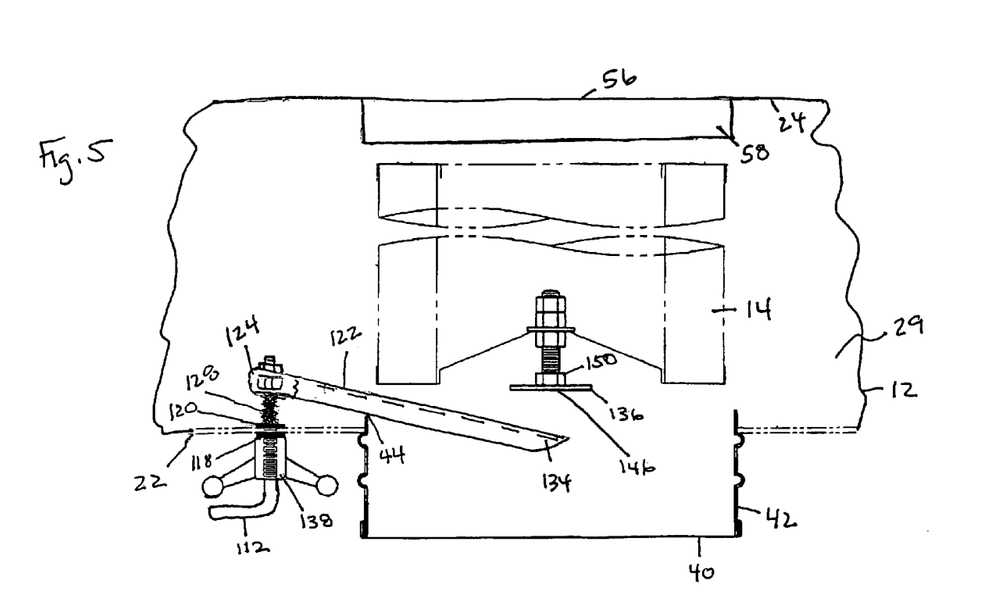
FIG. 5 is cross-sectional top view of the locking device shown in FIG. 1 in a spaced-apart position.

With continued reference to FIGS. 3 and 5, as the locking member 138 rotates, the compression on the spring 128 lessens as an increasing portion of the actuator 112 is moved into the plenum 12. The spring 128 pushes the first end 124 of the lever member 122 away from the wall 22 of the plenum 12. The lever member 122 moves on the pivot 44 in a first plane from the bearing position with the distal end 134 forceably bearing against the bearing face 146 of the filter 14 to a spaced-apart position where the distal end 134 of the lever member 122 is spaced apart from the bearing face 146. This releases the opposing end of the filter 14 from sealing engagement with the annular gasket 58 about the outlet 56 in the rear wall 24 of the plenum 12.

Figure 6:
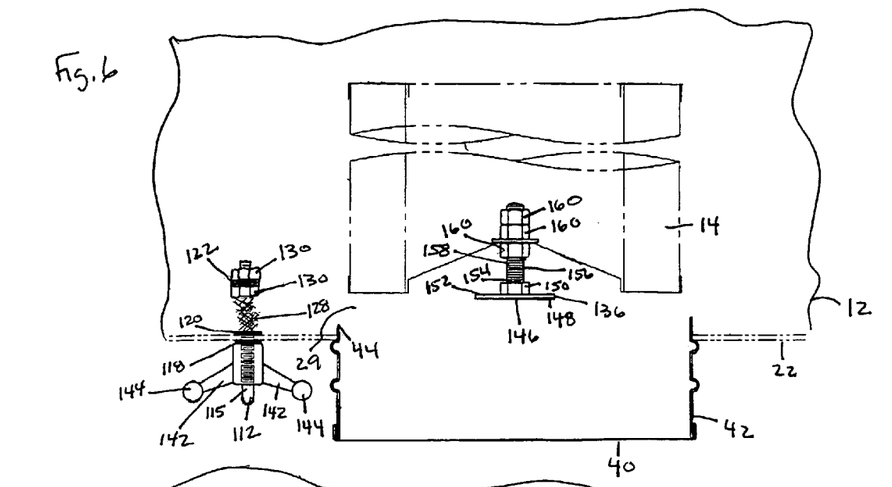
FIG. 6 is a cross-sectional top view of the locking device shown in FIG. 1 in an un-locked position.

FIGS. 6 and 7 illustrate the locking member 10 in the un-locked second position and the actuator 112 in a second position extended further into the plenum 12, for removal and replacement of the filter 14. The unthreaded portion 115 of the actuator member 112, being gripped and moved by a person changing the filter 14, rotates counterclockwise to the second position. This causes the lever member 122 to pivot. The pivoting or rotational movement of the lever 122 moves the distal end 134 in an arc in a second plane from spaced-apart alignment with the filter 14 to a spaced-apart un-aligned position lateral of the filter 14. The arcuate movement of the lever member 122 removes the pivot point 132 on the lever member 122 from contact with the pivot 44 on the collar 42.

With the lever arm 122 moved to the spaced-apart unaligned position relative to the filter 14, the plenum 12 is opened for replacement of the filter 14. With reference to FIG. 2, this is accomplished by removing the door 60. The handles 86 are loosened from holding the bar 62 in connection to the pins 78 by rotating counterclockwise. The handles 86 thereby move longitudinally relative to the pins 78 to space the handles 86 from the fingers 72. This releases the pins 78 for movement out of the gaps 76. Each pin 78 hingingly rotates by the unthreaded portion 82 of the pin 78 within the opening 110 pivoting outwardly away from the door 60. The bar 62 is grasped to remove the door 60 from the collar 42. The plenum 12 is then open to accessing the inner portion 29 of the plenum 12 for removal of the contaminated filter 14 and insertion of a new uncontaminated filter 14. The process of filter 14 replacement in a plenum 12 is well-understood in the art.

After seating the new uncontaminated filter 14, the plenum 12 is closed. The door 60 is placed in covering relation to the collar 42. The bar 62 is engaged to the pins 78 to secure the door 60 to the collar 42. This is accomplished by moving the pins 78 back toward the door 60. The unthreaded portion 82 of the pin 78 hingingly pivots within the loop member 100. The threaded portion 80 inserts into the gap 76. The handles 86 are rotated clockwise. This moves the handles 86 longitudinally against the fingers 72 to securely engage the door 60 to the pins 78.

With the door 60 re-secured in sealing relation to the collar 42, the locking device 10 is operated to secure the filter 14 in sealing relation to the outlet 56. With reference to FIGS. 7 and 4, this is accomplished by first moving the actuator member 112 from the second position to the first position. This moves the lever member 122 in the second plane from the unaligned position relative to the filter 14 to the aligned position. To do this, the unthreaded portion 115 of the actuator 112 is rotated clockwise to the first position. The rotational movement of the actuator 112 transfers to the lever member 122 inwardly of the plenum 12. The lever member 122 thereby rotates to move the distal end 134 of the lever member 122 from the unaligned position to the aligned position relative to the filter 14. The arcuate movement of the lever member 122 moves the pivot point 132 on the lever member 122 into contacting position with the pivot 44 on the collar 42.

Referring to FIG. 3, the locking member 138 then is moved to the locked position. This causes the lever arm 122 to bear forceably against the filter 14 to hold the filter in position and also locks the actuator 112 from inadvertent movement. The locking member 138 is rotated clockwise. The locking member 138 bears against the wall 22. In response, the actuator 112 moves outwardly guided by the threaded portion 114 moving relative to the rotating locking member 138. The actuator-112 moves outwardly and pulls the first end 124 of the lever 122 towards the wall 22. The spring 128 becomes compressed. Referring to FIGS. 5 and 3, the compressed spring 128 increases the force biasing the first end 124 of the lever member 122 away from the wall 22 of the plenum 12. The lever member 122 pivots on the pivot 44 to move the distal end 134 of the lever member 122 from the spaced-apart position into the bearing position pushing against the bearing face 146 of the palm button 136. The distal end of the filter 14 is thereby engaged in sealing registry with the annular gasket 58 about the outlet 56 in the rear wall 24 of the plenum 12.

The filter plenum 12 operates conventionally. Influent air carrying particulates and contaminates enter the plenum through an inlet. The air passes through the filter 14 which collects the particulates and contaminates. The filtered air communicates through the outlet 56. The particulates may fall to the hopper 32 for collection and disposal.

In an alternate embodiment (not illustrated), the pivot 44 is tapered relative to the front wall 22 inwardly of the plenum 12. Moving the actuator 112 between the second position and the first position causes the lever member 122 to move from the spaced-apart unaligned position to the aligned and secured position holding the filter 14 in place. This is accomplished by the lever member 122 bearing against the tapered surface of the pivot 44. The tapered surface cams the lever member 122 to move forceably against the filter 14 as the actuator 112 moves to its second position. The camming action moves the distal end 134 of the lever member 122 in a second plane to wedge the distal end 134 of the lever member 122 firmly against the bearing face 146 of the palm button 136 and thereby engage the filter 14 with the gasket 58 in registry with the outlet 56 of the plenum 12.

The present invention accordingly provides a cartridge locking device 10 for holding a filter 14 in a filter media plenum 12 yet allows releasing the filter 14 for replacement with reduced opening of the plenum 12 and minimal contact with the contaminated area inside of the plenum 12 when a contaminated filter media 14 is removed from the plenum 12 or an uncontaminated filter media 14 is installed into the plenum 12. The principles, preferred embodiments, and modes of operation of the present invention have been described in the foregoing specification. The invention is not to be construed as limited to the particular forms disclosed as these are regarded as illustrative rather than restrictive. Moreover, variations and changes may be made by those skilled in the are without departing from the spirit of the invention described in the following claims.

What is claimed is:

1. A cartridge locking device for releasably securing a filter in a plenum of a filtering assembly, comprising:
   an actuating member extending through an opening in a wall of the plenum, the actuating member being movable from a first locked position to a second unlocked position; and
   a lever member connected to the actuating member inwardly of the plenum, the lever member having a distal end that pivots into a bearing position for support the filter within the plenum when the actuating member moves to its locked position, and the distal end of the lever member pivoting into a spaced apart position from the filter when the actuating member moves to its unlocked position.

2. The cartridge locking device of claim 1, wherein:
   the lever member defines an elongated bar that is connected to the actuating member at a first end of the lever member; and
   the cartridge locking device further comprises a resilient member disposed between the plenum and the first end of the lever member to bias the first end of the lever member away from the wall of the plenum.

3. The cartridge locking device of claim 1, wherein:
   the lever member is connected to the actuating member at a first end of the lever member;
   the lever member also moves from a radially aligned position to a radially non-aligned position relative to the filter when the actuating member is in its unlocked position; and
   the lever member further comprises a pivot point intermediate the first and distal ends on an inner portion of the plenum about which the lever member moves to bear the distal end against the filter when the actuating member is in its locked position.

4. The cartridge locking device of claim 1, wherein:
   the lever member is connected to the actuating member at a first end of the lever member;
   the lever member also moves from a radially aligned position to a radially non-aligned position relative to the filter when the actuating member is in its unlocked position; and
   the cartridge locking device further comprises a locking member received on the actuating member outwardly of the plenum for selectively securing the position of the actuating member.

5. The cartridge locking device of claim 4, further comprising:
   a fastener that connects the lever member and the first end of the actuating member.

6. The cartridge locking device of claim 4, wherein:
   the locking member is threadedly received on the actuating member; and
   the locking member moves the actuating member between its locked and unlocked positions by rotation of the locking member relative to the actuating member.

7. The cartridge locking device of claim 4, wherein the locking member being in its un-locked position, movement of the actuating member from its radially aligned position to its radially non-aligned position causes the distal end of the lever member to move away from the filter.

8. The cartridge locking device of claim 4, wherein the actuating member being in its radially aligned position, the lever arm moves between a spaced apart position and a bearing position relative to the filter upon moving the locking member between its un-locked position and its locked position.

9. The cartridge locking device of claim 6, wherein the locking member being in its un-locked position, movement of the actuating member from its radially aligned position to its radially non-aligned position causes the distal end of the lever member to move away from the filter.

10. The cartridge locking device of claim 6, wherein the actuating member being in its radially aligned position, the lever arm moves between a spaced apart position and a bearing position relative to the filter upon moving the locking member between its un-locked position and its locked position.

11. The cartridge locking device of claim 1, wherein the lever member comprises an elongated bar having an opening in the first end that receives the actuating member.

12. The cartridge locking device in claim 11 wherein a portion of the actuating member is threaded.

13. The cartridge locking device of claim 5, wherein the fastener defines at least one nut that threadedly connects to the actuating member to connect the lever member and the actuating member.

14. The cartridge locking device of claim 2, wherein the resilient member is a spring.

15. The cartridge locking device of claim 4, wherein:
    the filter has a bearing surface; and
    the actuating member being in both its locked position and its radially aligned position, the distal end of the lever member bears against the bearing surface on the filter.

16. The cartridge locking device in claim 15 wherein the bearing surface is a palm button.

17. A cartridge locking device for holding a filter assembly in a plenum for a filtering apparatus, comprising:
    an actuating member extending through an opening in a wall of a the plenum and movable between a first locked position and a second unlocked position;
    a lever member connected to the actuating member inwardly of the plenum and having a distal end for bearing against the filter assembly within the plenum, the lever member in response to movement of the actuating member being movable in a first plane between a first bearing position and a second spaced-apart position relative to the filter assembly and in a second plane between a first radially aligned position and a second radially non-aligned positionrelative to the filter assembly;
    a resilient member for biasing a first end of the lever member away from the wall of the plenum; and
    a pivot on an inner portion of the plenum on which the lever member moves when the lever member is in the first position relative to the filter assembly;
    whereby movement of the actuating member between the first locked and second unlocked positions moves the lever member between the first bearing and second spaced-apart positions relative to the filter assembly.

18. The cartridge locking device in claim 17 wherein the resilient member is a spring.

19. The cartridge locking device of claim 17, further comprising:
 a locking member received on the actuating member outwardly of the plenum for securing the pivot member in position.

20. The cartridge locking device of claim 19, wherein the locking member being in its un-locked position, the lever member moves between its radially aligned position and its radially non-aligned position relative to the filter assembly upon moving the actuating member radially.

21. The cartridge locking device of claim 19, wherein the actuating member being in its unlocked position, the lever member moves between its spaced-apart position and its bearing position relative to the filter assembly upon moving the locking member between an un-locked position and a locked position.

22. The cartridge locking device of claim 17, wherein the lever member comprises an elongated bar having an opening in the first end that receives the actuating member.

23. The cartridge locking device of claim 17, further comprising a fastener that engages the actuating member to connect the lever member and the actuating member.

24. The cartridge locking device in claim 23 wherein the fastener is a threaded nut.

25. The cartridge locking device of claim 17, wherein the actuating member is L-shaped.

26. The cartridge locking device of claim 17, further comprising:
 a threaded locking member received on the actuating member outwardly of the plenum for securing the actuating member position, said locking member movable between an un-locked position and a locked position.

27. The cartridge locking device of claim 26, wherein the locking member comprises at least one handle portion and a threaded bore for receiving the actuating member.

28. The cartridge locking device of claim 21, wherein the filter assembly has a bearing surface defining a palm button that comprises:
 a bearing face on a first side of the palm button; and
 an annular flange extending from a second opposing side of the palm button and defining a threaded recess;
 whereby the threaded recess receives a shaft to secure the bearing member to the filter.

29. A cartridge locking device for holding a filter in a plenum of a filtering, comprising:
 an actuator member extending through an opening defined by a wall in the plenum and movable between a locking position and an unlocking position;
 a lever member connected to the actuator member inwardly of the plenum having a distal end for supporting the filter within the plenum, the lever member movable in a first plane between a bearing position and a spaced-apart position relative to the filter and also in a second plane between an alignment position and an un-alignment position relative to the filter, the lever member having a first end opposite the distal end, and an intermediate pivot point that pivots within the plenum;
 a locking member received on the actuator member for selectively securing the actuator member in its respective locking and unlocking positions, said locking member being movable between a locked position and an un-locked position; and
 a resilient member that biases a first end of the lever member away from the wall of the plenum;
 whereby with the locking member being in the un-locked position, the lever member moves between alignment and un-alignment positions upon moving the actuator member between its locking and unlocking positions for replacement of the filter within the plenum; and
 whereby the actuator member being in its aligned position, the lever member moves between bearing and spaced-apart positions relative to the filter upon moving the locking member between the locked and un-locked positions for holding the filter in the plenum.

30. The cartridge locking device in claim 29, wherein the resilient member is a spring.

31. The cartridge locking device of claim 29, wherein:
 the lever member comprises an elongated bar that is connected to the actuating member at a first end of the lever member.

32. The cartridge locking device of claim 29, wherein the locking member comprises a handle having a bore that threadedly receives the actuating member outwardly of the plenum.

33. The cartridge locking device of claim 32, wherein rotational movement of the locking member about the actuator causes the locking member to move the actuator member, thereby actuating movement of the connected lever member.

34. The cartridge locking device in claim 33 wherein the locking member further comprises a pair of arms for grippingly moving the locking member.

35. The cartridge locking device of claim 29, wherein the plenum supports a filter therein and the filter has a bearing surface whereby the lever member bears against the bearing surface on the filter when the lever member is in both its bearing and alignment positions.

36. The cartridge locking device in claim 35 wherein the bearing surface is a palm button connected to the filter.

37. A method of operating a cartridge locking device to hold a filter in a filter plenum and release the filter during replacement operations, comprising the steps of:
 (a) connecting an actuating member to a lever member proximate to a first end of the lever member and inwardly of the plenum, the lever member also having an intermediate pivot point and a distal end;
 (b) radially moving the actuating member from a first radial position to a second radial position, thereby causing the distal end of the lever member to move from a radially unaligned position relative to the filter to a radially aligned position; and
 (c) moving the actuating member from a first linear position to a second linear position, thereby causing the distal end of the lever member to pivot from an unlocked position spaced apart from the filter to a locked position securing the filter in the plenum.

38. The method as recited in claim 37, further comprising the step of:
 (d) moving the locking member from its locked position to its unlocked position, thereby causing the distal end of the lever member to move from its locked position to its unlocked position.

39. The method as recited in claim 38, further comprising the step of:
 (e) radially moving the actuating member from its second radial position to its first radial position, thereby causing the distal end of the lever member to move from its radially aligned position relative to the filter to its radially unaligned position.

40. The method as recited in claim 38, further comprising the steps of:
 (f) removing a door from the wall of the plenum; and
 (g) removing the filter from the plenum.

\* \* \* \* \*